Figure 1:
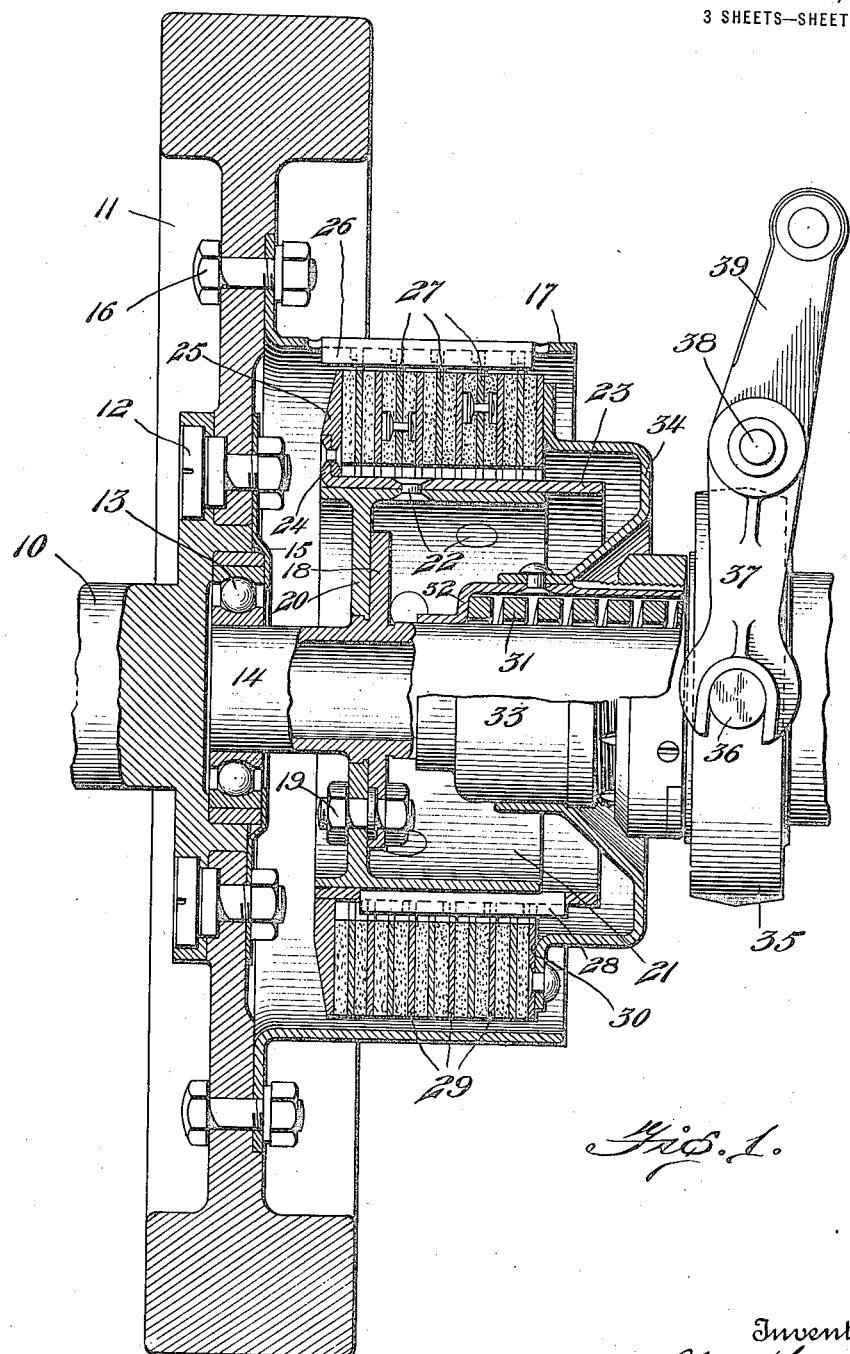

A. LOOMIS.
CLUTCH.
APPLICATION FILED FEB. 28, 1913.

1,172,146.

Patented Feb. 15, 1916.
3 SHEETS—SHEET 1.

Witnesses
B. M. Offutt
B. M. Kent

Inventor
Allen Loomis

Foster, Freeman, Watson & [...]
Attorneys

A. LOOMIS.
CLUTCH.
APPLICATION FILED FEB. 28, 1913.
1,172,146.
Patented Feb. 15, 1916.
3 SHEETS—SHEET 2.
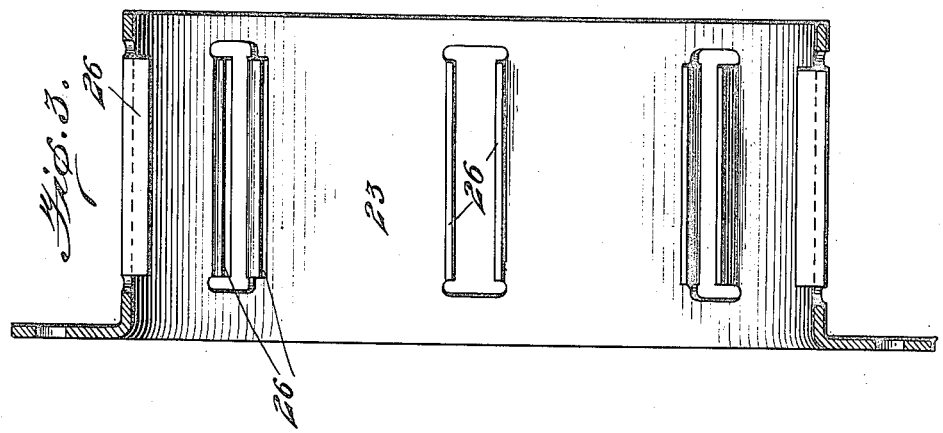
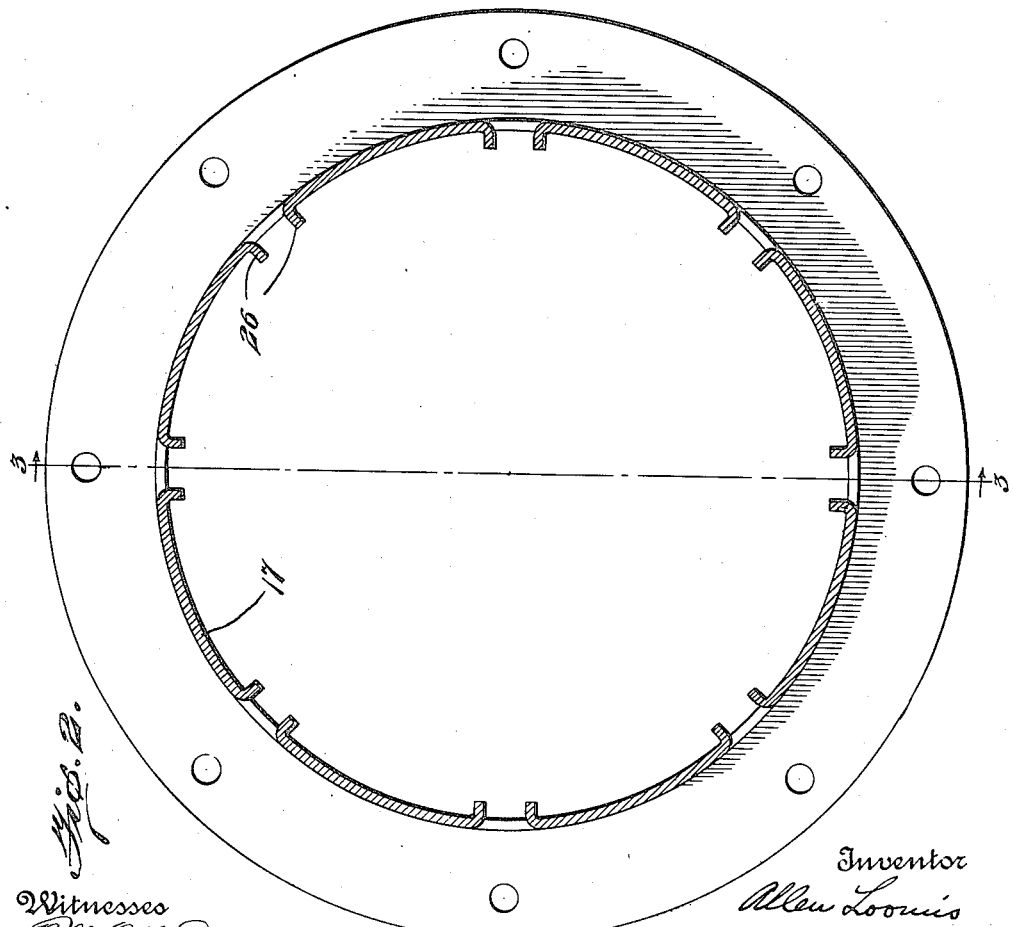

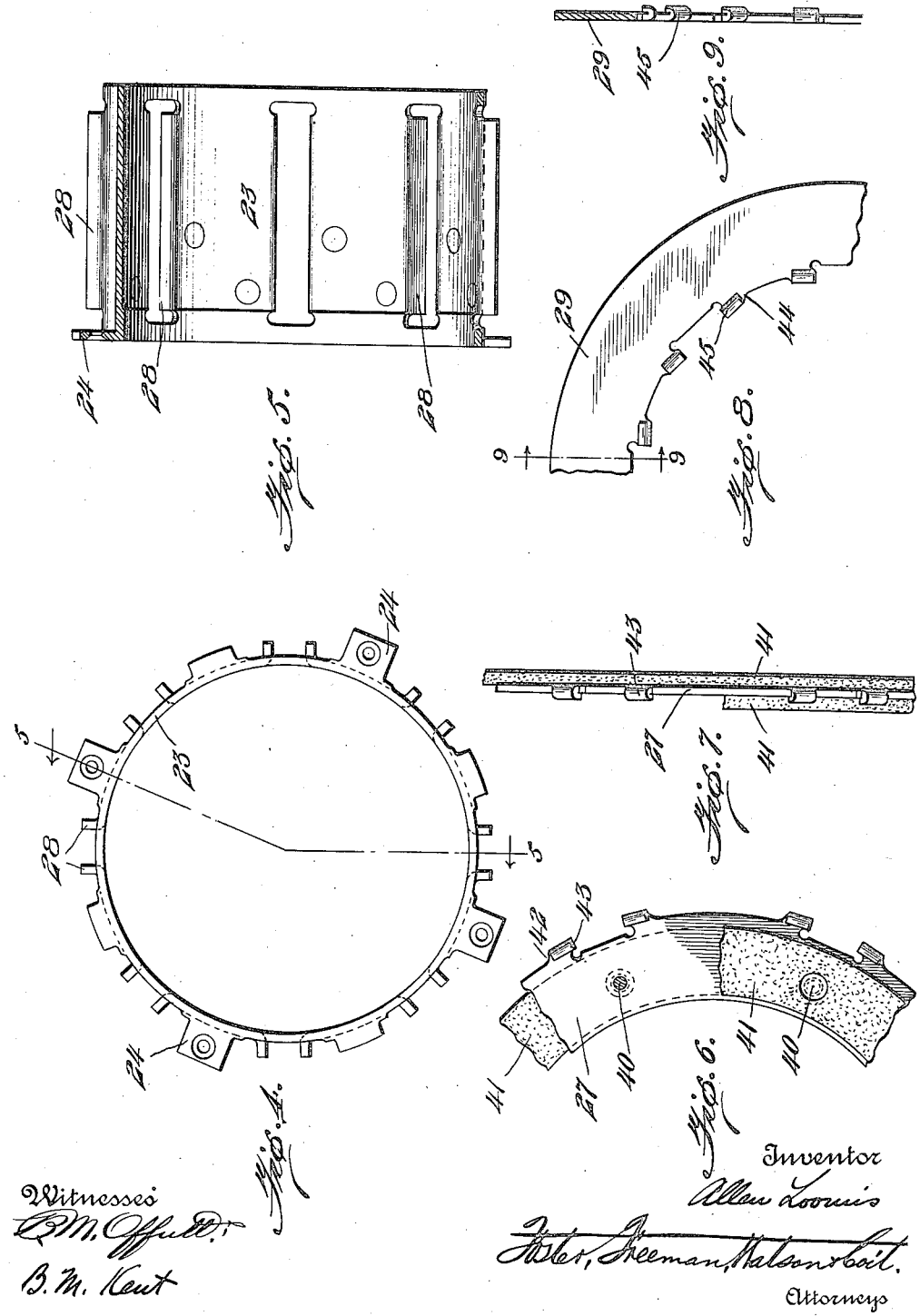

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

CLUTCH.

1,172,146.  Specification of Letters Patent.  Patented Feb. 15, 1916.

Application filed February 28, 1913. Serial No. 751,332.

*To all whom it may concern:*

Be it known that I, ALLEN LOOMIS, a citizen of the United States, and resident of Detroit, county of Wayne, and State of Michigan, have invented certain new and useful Improvements in Clutches, of which the following is a specification.

This invention relates to motor vehicles and more particularly to the clutch mechanism for connecting the crank shaft of the motor with the propeller shaft of the vehicle.

The objects of the invention are to provide a clutch mechanism of the multiple disk type which is simple in construction and comparatively inexpensive to manufacture.

The novel features of the invention will be apparent from the following description taken in connection with the accompanying drawings in which, Figure 1 is a longitudinal section through a clutch mechanism embodying my invention; Fig. 2 is a transverse section through the outer casing of the clutch mechanism shown in Fig. 1; Fig. 3 is a section on the line 3—3, of Fig. 2; Fig. 4 is an end elevation of the inner disk carrying member; Fig. 5 is a section on the line 5—5 of Fig. 4; Fig. 6 is a fragmentary side elevation of one of the clutch disks carried by the outer casing; Fig. 7 is an edge view thereof; Fig. 8 is a fragmentary side elevation of one of the disks carried by the inner member; Fig. 9 is a transverse section thereof on the line 9—9.

Referring to the drawings, 10 indicates the end of the motor crank shaft which has secured thereon a fly wheel 11, by means of bolts 12. The end of the crank shaft 10 is recessed to receive the radial ball bearing 13 which supports the end of the clutch shaft 14, the bearing being retained in position by a plate 15 which is secured to the fly wheel 11 by the bolts 12.

Secured to the fly wheel 11 by means of the bolts 16 is the outer casing or cylinder 17 of the clutch. The shaft 14 is provided with a flange 18 which has secured thereto, by means of bolts 19, the interior web 20 of the inner disk carrying member or cylinder 21. The cylinder 21 has secured thereon by means of rivets 22 or in any other suitable manner, a cylinder 23 having radial lugs 24 to which is riveted or otherwise secured an annular plate or disk 25.

The casing or cylinder 17 is preferably formed of steel and provided with the inwardly projecting axially extending lugs or keys 26 which are adapted to engage the series of clutch disks 27 and cause the latter to rotate therewith. The cylinder or disk carrying member 23 is preferably formed of steel and has outwardly projecting axially extending lugs or keys 28 which are adapted to engage the series of clutch disks 29 and cause the latter to rotate therewith. The disks 27 and 29 are alternately arranged between the plate 25 and an end plate 30 and are normally pressed together in gripping engagement, so as to form a driving connection between the crank shaft and the clutch shaft, by means of a spring 31 which surrounds the clutch shaft and engages the inturned flange 32 on a sleeve 33 and tends to force the sleeve and the plate 30, with which the latter is rigidly connected by a member 34, toward the crank shaft 10. Any suitable mechanism for releasing the clutch disks may be provided and for this purpose I have shown a collar 35 having trunnions 36 which are engaged by arms 37 on a shaft 38, which is adapted to be actuated by an arm 39.

The novel features of this invention relate more specifically to the construction of the inner disk carrying member 23, the casing 17 and the clutch disks. The member 23 is formed by making I-shaped cuts therein and then bending the tongues 28, thus formed, outwardly to the position shown in the drawings. The casing 17 is similarly formed by making I-shaped cuts therein and then bending the tongues, thus formed, inwardly as shown. As will be readily understood this is a comparatively inexpensive construction and is the full equivalent of the prior constructions in which keys were riveted or otherwise secured to the disk carrying members.

The disks 27 are stamped from sheet metal and have secured thereto, by means of rivets 40, the rings 41 of friction material. In order to provide the disks 27 with suitable means for engaging the keys 26 they are formed with lugs 42 which, in order to provide greater bearing surface on the keys have their ends doubled back, as indicated at 43. It will be seen that, by thus forming the ends of the lugs 42, the thickness thereof and the bearing surface are substantially doubled. The disks 29 are provided with lugs 44 adapted to engage the keys 28 and these lugs, as in the case of the lugs 42, have their ends doubled back as shown at 45, for the purpose described.

Having thus described my invention what I claim and desire to secure by Letters-Patent is,

1. In a clutch, the combination of an outer casing having interiorly arranged axially extending keys, a plurality of friction members carried by said casing and having recesses on their peripheries adapted to receive said keys, a spider having a sheet metal periphery provided with integral outwardly pressed axially extending portions, a plurality of friction members alternately arranged with respect to the first-mentioned friction members and engaging said portions, and means for pressing said friction members into gripping engagement.

2. In a clutch, an outer casing having axially extending openings formed therein and with the metal on opposite sides of said openings turned inwardly to form keys on the interior of the casing.

3. In a clutch, an outer casing having I-shaped cuts therein, said cuts providing tongues on opposite sides thereof, and said tongues being turned to positions substantially normal to the surface of the casing, as and for the purpose described.

In testimony whereof I affix my signature in presence of two witnesses.

ALLEN LOOMIS.

Witnesses:
FLORENCE O'CONNOR,
LE ROI J. WILLIAMS.